UNITED STATES PATENT OFFICE.

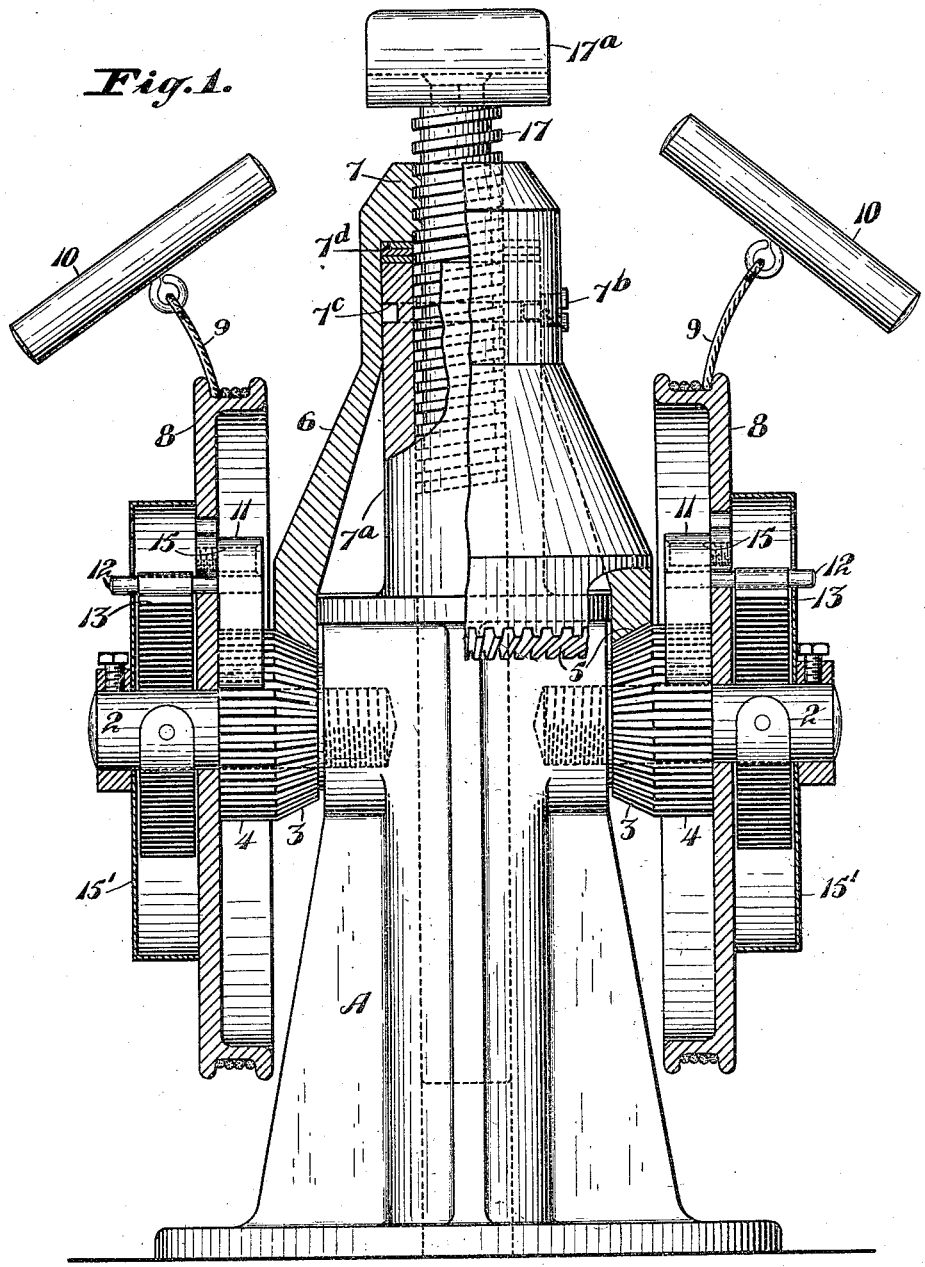

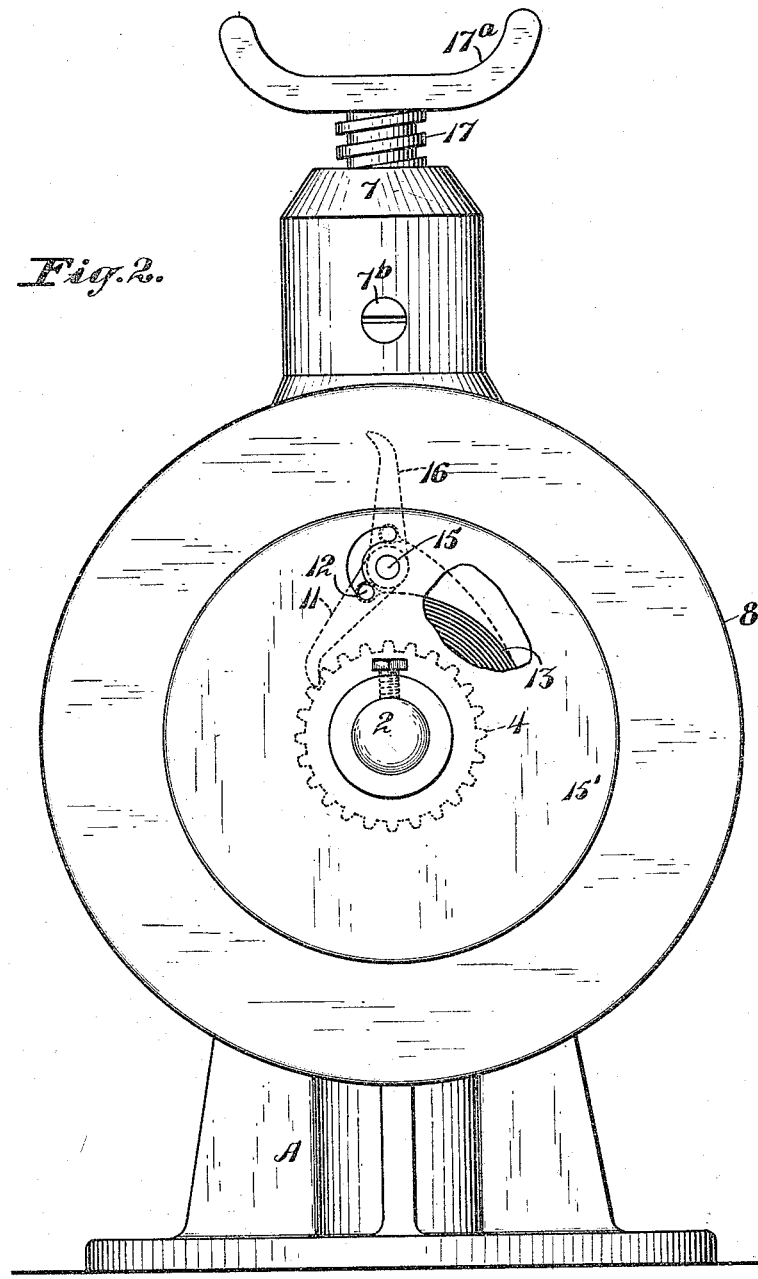

WILLIAM H. FIREBAUGH, JR., OF BERKELEY, CALIFORNIA.

JACK.

1,295,468.  Specification of Letters Patent.  Patented Feb. 25, 1919.

Application filed May 1, 1918. Serial No. 231,801.

*To all whom it may concern:*

Be it known that I, WILLIAM H. FIREBAUGH, Jr., a citizen of the United States, residing at Berkeley, in the county of Alameda and State of California, have invented new and useful Improvements in Jacks, of which the following is a specification.

This invention relates to a lifting jack for use in connection with automobiles, trucks, and the like.

One of the objects of the present invention is to provide a simple, substantial, easily operated lifting jack comprising a pedestal, a lifting screw extending vertically therethrough, a nut whereby the screw may be raised or lowered and a means for rotating the nut. Another object of the invention is to provide a flexible cord operating mechanism which, when a pull is exerted thereon, will transmit power to rotate the nut. Another object of the invention is to provide means for automatically retracting the cord the moment it is released. Further objects will hereinafter appear.

The invention consists of the parts and the construction, combination and arrangement of parts as hereinafter more fully described and claimed, having reference to the accompanying drawings in which—

Figure 1 is a central, vertical section through the lifting jack.

Fig. 2 is a side elevation showing the housing inclosing the rewinding spring partly broken away.

Referring to the drawings in detail, A indicates a pedestal, 2 a pair of stud shafts secured one on each side thereof, 3 a pair of bevel gears turnably mounted one on each shaft, and 4 a pair of ratchet gears also turnably mounted one on each shaft. The gears 3 and 4 may be formed integral with each other or secured to revolve in unison. They are provided for the purpose of rotating a nut generally indicated at 7. Forming a part of the nut is a conical extension 6 on the lower end of which is formed a bevel gear 5. This gear intermeshes with the bevel pinions 3 and may therefore be rotated by either in one direction or the other.

The bevel gear 5 and the nut 7 formed as a portion thereof are journaled on a vertical bearing member $7^a$ forming a portion of the pedestal or base section A, and they are locked against vertical movement by a set screw $7^b$ secured below the nut and extending into an annular groove $7^c$ formed in the upper end of the bearing member $7^a$.

Carried by the nut 7 is a lifting screw 17. This screw extends vertically through the bearing $7^a$ and the pedestal or base A, and is therefore free to be raised or lowered with relation thereto, this being accomplished by rotation of the nut 7 in one direction or the other. The upper end of the screw is fitted with a yoke $17^a$, and the pressure exerted on the yoke and the screw 17, when the load is lifted, is taken up by the nut 7 which is supported on a plurality of thrust washers $7^d$ interposed between the lower side of the nut and the top of the vertical bearing $7^a$.

One of the main features of the present invention is the mechanism provided for rotating either or both of the bevel pinions 3. This is accomplished in the following manner: Turnably mounted on each shaft 2 is a pulley 8 and pivotally mounted on the inner side of each pulley is a pawl 11, which may be thrown into or out of engagement with the teeth of the respective ratchet gears 4. Extending outwardly from each pawl is a pin 12 and secured at one end to each pin is a coiled spring 13, the inner end of which is secured to the shafts 2. Each pawl is pivoted on its respective pulley 8 at its upper end, or at the point indicated at 15, while the pin 12 carried by each pawl extends outwardly at a point below the pivotal connection 15. A pull exerted by either of the springs 13 will therefore retain each pawl in engagement with the teeth of the ratchet gears 4 when the pawls are depressed, or will retain the same out of engagement with the teeth when they are lifted to the raised dotted line position shown at 16. This is due to the fact that the constant pull of either spring 13 is exerted above the pivotal connections 15 when the pawls are raised, thus retaining them in the raised position, or it is exerted below the pivotal point 15 when the pawls are lowered, thus retaining the same in the depressed position or in engagement with their respective ratchet gears. The pins 12 are sufficiently long to permit them to be readily grasped when it is desired to raise or lower the same, and it must be remembered that they should always assume alternate positions, that is, if it is desired to raise the lifting screw 17 then it is only necessary to depress the pawl on the right-hand side and raise the pawl on the left-hand side. A pull exerted on the flexible wire cord wound about the pulley on the right-hand side will cause this to rotate and transmit revolving movement to the nut 7, due to the fact that the pawl carried by said pulley will engage the teeth of its coöperating ratchet gear and thus revolve the adjacent bevel pinion and the bevel gear 5 intermeshing therewith, the gears 3 and 4 on the opposite side running idle at the same time the pawl on that side stands in raised position. The coöperating coiled spring 13 is simultaneously wound or placed under tension when the pulley 8 is rotated by pulling on the handle 10 which is attached to the wire cable 9 wound about the pulley, and it is therefore only necessary to release the handle to rewind the cable about the pulley, this being due to the fact that sufficient tension is stored up in the spring 13 during the unwinding of the cord to rewind it when the cord is released. No movement is transmitted to the gears 3, 4 and 5 when the cord is being rewound as the opposite revolution of the pulley will permit the pawl 11 to slide over the teeth of the ratchet gear 4. A continued pulling and releasing of the cord 9 will intermittently rotate the pulley 8, first in one direction and then in the other, but will only rotate the nut 7 in one direction, this being the direction in which the screw 17 is lifted. Comparatively little resistance is encountered when pulling on the cord, due, first, to the leverage between the pulley and the ratchet gear 4, secondly, to the ratio between the gears 3 and 5, and, thirdly, to the screw action obtained between the nut 7 and the screw 17.

Practically any one can therefore easily operate the jack, even though a comparatively heavy load is being lifted. It should be recognized that it can be more readily and conveniently operated than ordinary jacks, as the length of the flexible cord 9 may be such that the operator can stand upright behind the automobile when the jack is placed directly under the shaft. When it is desired to lower the jack it is only necessary to lift the pawl on the right-hand side and to lower the pawl on the left-hand side. The handle 10 attached to the cord and left-hand pulley is then alternately pulled and released, and movement will consequently be transmitted to revolve the nut 7 in the opposite direction, thus permitting the screw 17 to be quickly and easily lowered without inconveniencing the operator in the least, this being due to the fact that the wire cables or cords 9 may be as long as desired, and also due to the fact that they are automatically rewound each time they have been pulled out or extended. The lifting screw 17 moves freely up and down in a central passage formed in the bearing 7ª and in the pedestal A. It may therefore be threaded from end to end and should also turn freely at all times as the only point of contact is the nut 7. The springs 13 carried by each shaft 2 and attached to the pins 12 may be inclosed by a housing, such as shown at 15', and, in fact, the jack as a whole may be inclosed in the housing, if desired. The cables 9 are under that condition passed through slots formed in the outer housing.

This feature of the invention, together with the materials and finish of the several parts employed, should, however, form no important part of the invention as it will be determined entirely by the size of the jack and the use to which it is applied.

I further wish it understood that various changes in the form, proportions and minor details of construction may be resorted to within the scope of the appended claims, and that I do not wish to limit myself to the specific design and construction here shown.

Having thus described my invention, what I claim and desire to secure by Letters Patent is:

1. A lifting jack comprising a pedestal having a vertically disposed bearing member formed on its upper end, said bearing member and pedestal having a vertical, central passage formed therein, a nut supported on the upper end of said bearing, a lifting screw carried by the nut and extending downwardly through the central passage, an extension on the lower end of the nut having a gear secured thereto, said extension being guided by the vertical bearing and turnably mounted thereabout, a pair of stud shafts secured on the pedestal, one on each side thereof, a pair of gears journaled one on each shaft and intermeshing with the first-named gear, a ratchet gear secured to each bevel gear and turnable in unison therewith, a pulley loosely turnable on each shaft, a pawl pivotally mounted on each pulley adapted to engage the respective ratchet gears, means for retaining each pawl in or out of engagement with said ratchet gears and means for turning each pulley independent of the other.

2. A lifting jack comprising a pedestal having a vertically disposed bearing member formed on its upper end, said bearing member and pedestal having a vertical, central passage formed therein, a nut supported on the upper end of said bearing, a lifting screw carried by the nut and extending downwardly through the central passage, an extension on the lower end of the nut having a gear secured thereto, said extension being guided by the vertical bearing and turnably mounted thereabout, a pair of stud shafts secured on the pedestal, one on each side thereof, a pair of gears journaled one on each shaft and intermeshing with the first-named gear, a ratchet gear secured to each bevel gear and turnable in unison therewith, a pulley loosely turnable on each shaft, a pawl pivotally mounted on each pulley adapted to engage the respective ratchet gears, means for retaining each pawl in or out of engagement with said ratchet gears and means for turning each pulley independent of the other, said means comprising a flexible cord for each pulley, said cords being secured at one end to the respective pulleys and wound thereabout, and a hand grip secured on the free end of each cord to permit either cord to be pulled to unwind itself and simultaneously rotate the pulley upon which it is wound.

3. A lifting jack comprising a pedestal having a vertically disposed bearing member formed on its upper end, said bearing member and pedestal having a vertical, central passage formed therein, a nut supported on the upper end of said bearing, a lifting screw carried by the nut and extending downwardly through the central passage, an extension on the lower end of the nut having a gear secured thereto, said extension being guided by the vertical bearing and turnably mounted thereabout, a pair of stud shafts secured on the pedestal, one on each side thereof, a pair of gears journaled one on each shaft and intermeshing with the first-named gear, a ratchet gear secured to each bevel gear and turnable in unison therewith, a pulley loosely turnable on each shaft, a pawl pivotally mounted on each pulley adapted to engage the respective ratchet gears, means for retaining each pawl in or out of engagement with said ratchet gears, means for turning each pulley independent of the other, said means comprising a flexible cord for each pulley, said cords being secured at one end to the respective pulleys and wound thereabout, and a hand grip secured on the free end of each cord to permit either cord to be pulled to unwind itself and simultaneously rotate the pulley upon which it is wound, and means for automatically rewinding the cords upon the respective pulleys, said means comprising a coiled spring secured on each shaft having their inner ends secured to the respective shafts and their outer free ends secured to the pulleys.

4. A lifting jack comprising a pedestal having a vertically disposed bearing member formed on its upper end, said bearing member and pedestal having a vertical, central passage formed therein, a nut supported on the upper end of said bearing, a lifting screw carried by the nut and extending downwardly through the central passage, an extension on the lower end of the nut having a gear secured thereto, said extension being guided by the vertical bearing and turnably mounted thereabout, a shaft secured on each side of the pedestal, a gear journaled on each shaft engaging with the first-named gear, means for manually turning each gear independent of the other in one direction a predetermined number of revolutions and means for automatically turning the gears a similar number of turns in the opposite direction.

5. A lifting jack comprising a pedestal having a vertically disposed bearing member formed on its upper end, said bearing member and pedestal having a vertical, central passage formed therein, a nut supported on the upper end of said bearing, a lifting screw carried by the nut and extending downwardly through the central passage, an extension on the lower end of the nut having a gear secured thereto, said extension being guided by the vertical bearing and turnably mounted thereabout, a shaft secured on each side of the pedestal, a gear journaled on each shaft engaging with the first-named gear, means for manually turning each gear independent of the other in one direction a predetermined number of revolutions, and means for automatically turning the gears a similar number of turns in the opposite direction, said means comprising a ratchet gear secured to, and adapted to turn in unison with, each bevel gear, a pulley turnably mounted on each shaft, a pawl pivotally mounted on each pulley adapted to be thrown into or out of engagement with the respective ratchet gears, a flexible cord wound about each pulley having one end secured thereto and having a handle on the opposite end by which each cord may be pulled to rotate each pulley, and a coiled spring surrounding each shaft, said coiled springs having their inner ends secured to their respective shafts and their outer ends secured to the pulleys.

6. A lifting jack comprising a pedestal having a vertically disposed bearing member formed on its upper end, said bearing member and pedestal having a vertical, central passage formed therein, a nut supported on the upper end of said bearing, a lifting screw carried by the nut and extending downwardly through the central passage, an extension on the lower end of the nut having a gear secured thereto, said extension being guided by the vertical bearing and turnably mounted thereabout, a shaft secured on each side of the pedestal, a gear journaled on each shaft engaging with the first-named gear, means for manually turning each gear independent of the other in one direction a predetermined number of revolutions, and means for automatically turning the gears a similar number of turns in the opposite direction, said means comprising a ratchet gear secured to and adapted to turn in unison with each bevel gear, a pulley turnably mounted on each shaft, a pawl pivotally mounted on each pulley adapted to be thrown into or out of engagement with the respective ratchet gears, a flexible cord wound about each pulley having one end secured thereto and having a handle on the opposite end by which each cord may be pulled to rotate each pulley, and a coiled spring surrounding each shaft, said coiled springs having their inner ends secured to their respective shafts and their outer ends secured to the pawls to automatically retain said pawls in or out of engagement with the respective ratchet gears.

7. A lifting jack comprising a pedestal, a nut turnably mounted on the pedestal, a lifting screw carried by the nut and extending through the pedestal, a gear carried by the nut, a pair of gears journaled on the pedestal intermeshing with the first named gear, a ratchet gear turnable in unison with each last named gear, a pulley independently turnable with relation to each ratchet gear, a pawl pivotally mounted on each pulley adapted to be thrown into and out of engagement with the respective ratchet gears, a flexible cord wound about each pulley having one end secured thereto, and having a handle on the opposite end by which each cord may be pulled to rotate each pulley, and a coiled spring within each pulley, said coiled springs having their inner ends secured to stationary supports and their outer ends secured to the pulleys.

8. A lifting jack comprising a pedestal, a nut turnably mounted on the pedestal, a lifting screw carried by the nut and extending through the pedestal, a gear carried by the nut, a pair of gears journaled on the pedestal intermeshing with the first named gear, a ratchet gear turnable in unison with each last named gear, a pulley independently turnable with relation to each ratchet gear, a pawl pivotally mounted on each pulley adapted to be thrown into and out of engagement with the respective ratchet gears, a flexible cord wound about each pulley having one end secured thereto, and having a handle on the opposite end by which each cord may be pulled to rotate each pulley, and a coiled spring within each pulley, said coiled springs having their inner ends secured to stationary supports and their outer ends secured to the respective pawls.

9. In a lifting jack of the character described, the combination with the pedestal and the stud shafts projecting therefrom, of a ratchet gear turnably mounted on each shaft, a pulley turnably mounted on each shaft, a pawl pivotally mounted on each pulley and engageable with the respective ratchet gears, a coiled spring surrounding each shaft, said coiled springs having their inner ends secured to the shaft and their outer ends secured to projecting pins, one carried by each pawl, and manually controlled means for turning each pulley in one direction.

10. In a lifting jack of the character described, the combination with the pedestal and the stud shafts projecting therefrom, of a ratchet gear turnably mounted on each shaft, a pulley turnably mounted on each shaft, a pawl pivotally mounted on each pulley and engageable with the respective ratchet gears, a pin secured to each pawl and projecting outwardly therefrom, said pins being secured to each pawl at a point intermediate the pivotal mounting on the pawl and the tooth of the pawl and a coiled spring secured to each pin at the outer end and at the inner end to the shaft.

In testimony whereof I have hereunto set my hand in the presence of two subscribing witnesses.

WILLIAM H. FIREBAUGH, Jr.

Witnesses:
W. H. FIREBAUGH,
I. S. RANKIN.

Copies of this patent may be obtained for five cents each, by addressing the "Commissioner of Patents, Washington, D. C."